US012676863B2

(12) United States Patent　(10) Patent No.:　US 12,676,863 B2
Benavides　(45) Date of Patent:　Jul. 7, 2026

(54) ZERO TRUST DATA ACCESS (ZTDA) BASED ON SECURITY POSTURE TAGS

(71) Applicant: Fortinet, Inc., Sunnyvale, CA (US)

(72) Inventor: Julian H. Benavides, Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 53 days.

(21) Appl. No.: 18/901,244

(22) Filed: Sep. 30, 2024

(65) Prior Publication Data

US 2026/0095460 A1　Apr. 2, 2026

(51) Int. Cl.
H04L 9/40　(2022.01)

(52) U.S. Cl.
CPC ............ H04L 63/105 (2013.01); H04L 63/02 (2013.01)

(58) Field of Classification Search
CPC ......... H04L 63/20; H04L 63/30; H04L 63/02; H04L 63/105; G06F 21/577
See application file for complete search history.

(56) References Cited

U.S. PATENT DOCUMENTS

| | | | | |
|---|---|---|---|---|
| 10,909,236 | B2 | 2/2021 | Mehta et al. | |
| 10,944,561 | B1 * | 3/2021 | Cahill ................... | H04L 9/3213 |
| 11,388,006 | B2 * | 7/2022 | Wang .................... | H04L 9/3213 |
| 11,595,372 | B1 * | 2/2023 | Sharifi Mehr .......... | H04L 47/20 |
| 11,962,704 | B1 | 4/2024 | Valkaitis | |
| 12,463,995 | B1 * | 11/2025 | Welsh ................... | H04L 67/306 |
| 2021/0377273 | A1 * | 12/2021 | Lu ........................ | H04L 67/1097 |
| 2022/0321362 | A1 * | 10/2022 | Konda ................... | G06F 21/57 |
| 2023/0336592 | A1 * | 10/2023 | Narayanaswamy .... | H04L 63/20 |
| 2024/0348652 | A1 * | 10/2024 | Desigan .............. | H04L 63/1433 |
| 2025/0193240 | A1 | 6/2025 | Bishop et al. | |
| 2025/0202942 | A1 * | 6/2025 | Kondapi ................. | H04L 63/10 |

* cited by examiner

*Primary Examiner* — Tonia L Dollinger
*Assistant Examiner* — Linh T. Nguyen
(74) *Attorney, Agent, or Firm* — Law Office of Dorian Cartwright; Dorian Cartwright

(57)　ABSTRACT

Security posture tags are calculated from security posture updates about data files gathered from a plurality of security posture agents executing on a plurality of network devices. A request for access including a name of a data file is received. A security posture tag associated with the data file receive. One or more zero trust data access (ZTDA) network policies associated with data file itself is applied as corresponding to the request and/or the data of the security posture tag are applied. Access to the data file of the request is then provided, subject to application of the one or more ZTDA network policies identified as corresponding to the request.

13 Claims, 6 Drawing Sheets

400

START

CREATE A DATA FILE WITH A DATA FILE ACCESS POLICY
410

ESTABLISH SECURE NETWORK ACESS FOR A USER DEVICE
420

PROCESS DATA ACCESS REQUESTS FOR THE DATA FILE USING SECURITY POSTURE TAGS
430 (See detail in FIG. 5)

RETURN RESPONSE OF ALLOWED OR DENIED FOR DATA ACCESS REQUESTS
440

END

100

<u>400</u>

430

FROM
STEP 420

CALCULATE SECURITY POSTURE TAGS
FROM SECURITY POSTURE UPDATES
ABOUT DATA FILES FROM AGENTS
510

RECEIVE REQUEST FOR ACCESS TO
A DATA FILE
520

RETRIEVE ZTDA ACCESS POLICIES
CORRESPONDING TO
A SECRITY POSTURE TAG
530

APPLY ZTDA ACCESS POLICIES TO
DETERMINE WHETHER ACCESS TO THE
DATA FILE WILL BE ALLOWED OR DENIED
540

TO STEP
440

ZERO TRUST DATA ACCESS (ZTDA) BASED ON SECURITY POSTURE TAGS

FIELD OF THE INVENTION

The invention relates generally to computer networks, and more specifically, to providing zero trust data access (ZTDA) based on security posture tags associated with data files

BACKGROUND

Network security is critical for managing a large amount of users and a large amount of devices on private data communication networks, such as an enterprise network or a home network. Conventional network security operates by limiting access to a network. For example, virtual private networks (VPNs) are a form of network security that provides a secure connection for a user device over a public network to a private network. Another form of network access, zero trust network access (ZTNA), provides a secure connection for a user device over a public network to specific applications and services of a private network. These technologies allow and deny permission using a network access paradigm.

One problem with network security is the variance in security readiness between different devices on a private network. Each device has an individual profile with respect to operating system, hardware, software applications, network protocols, network communication ports, and the like. Furthermore, a baseline hardware or software can have different latest versions and latest patch levels that constantly change. Consequently, different devices require different network access policies for protection.

Moreover, because network security is driven by access to devices and services, access to a specific data file may differ on different devices and may differ on different services. In a data farm, data files are often moved around to optimize system level performance. Although data files offer some internal protections, such as a password requirement to open a PDF file, the malicious actor already has access to the data file and has opportunity to hack the password.

Therefore, what is needed is a robust technique for a new paradigm of data layer access using ZTDA based on security posture tags associated with data files, rather than network layer access. This allows an owner of the data file to ensure integrity apart from network policy.

SUMMARY

To meet the above-described needs, methods, computer program products, and systems for ZTDA based on security posture tags associated with data files.

In one embodiment, security posture tags are calculated from security posture updates about data files gathered from a plurality of security posture agents executing on a plurality of network devices.

In another embodiment, a request for access including a name of a data file is received. The request has established secured network access. The request does not include a specific location of the data file. A security posture tag associated with the data file receive. One or more ZTDA network policies is applied as corresponding to the request and/or the data of the security posture tag are applied.

Access to the data file of the request is then provided, subject to application of the one or more ZTDA network policies identified as corresponding to the request.

Advantageously, network performance and network devices are improved with better network security.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for ZTDA based on security posture tags associated with data files. The following disclosure is limited only for the purpose of conciseness, as one of ordinary skill in the art will recognize additional embodiments given the ones described herein.

Figure 2:
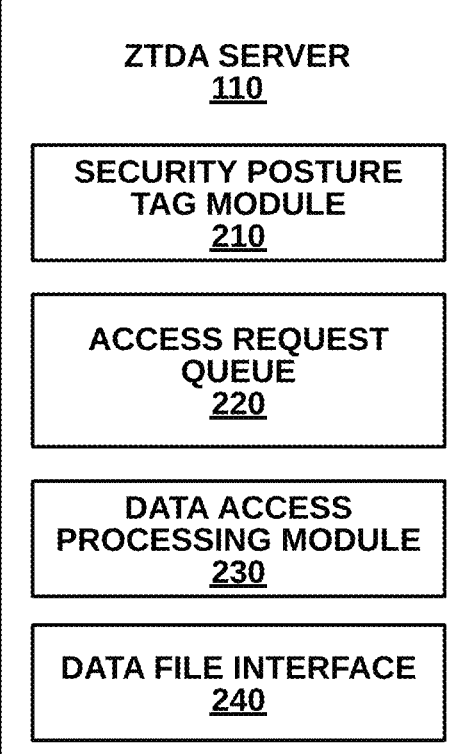
FIG. 2 is a more detailed block diagram illustrating a ZTDA server of the system of FIG. 1, according to an embodiment.
Figure 3:
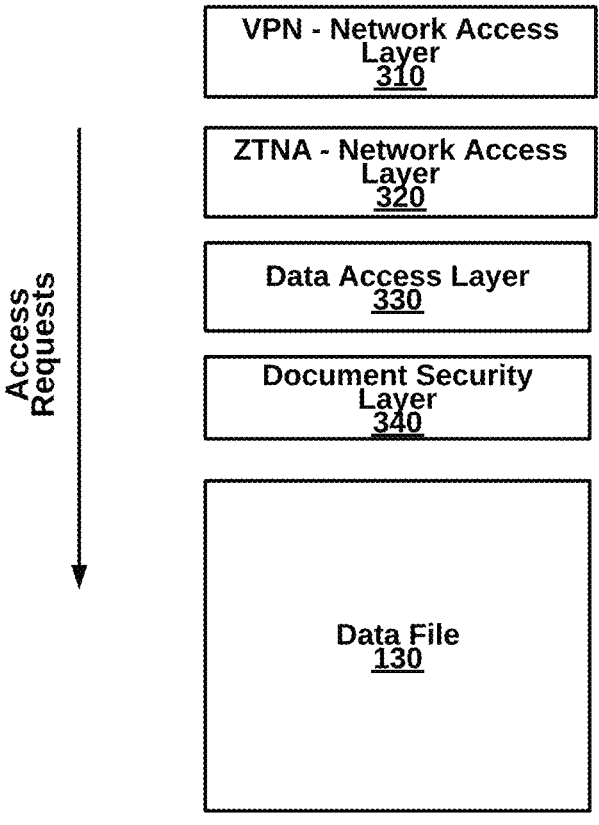
FIG. 3 is a more detailed block diagram illustrating a data security layer among different security layers associated with a data file, according to an embodiment.

I. Systems for ZTDA Using Security Posture Tags (FIGS. 1-3)

Figure 1:
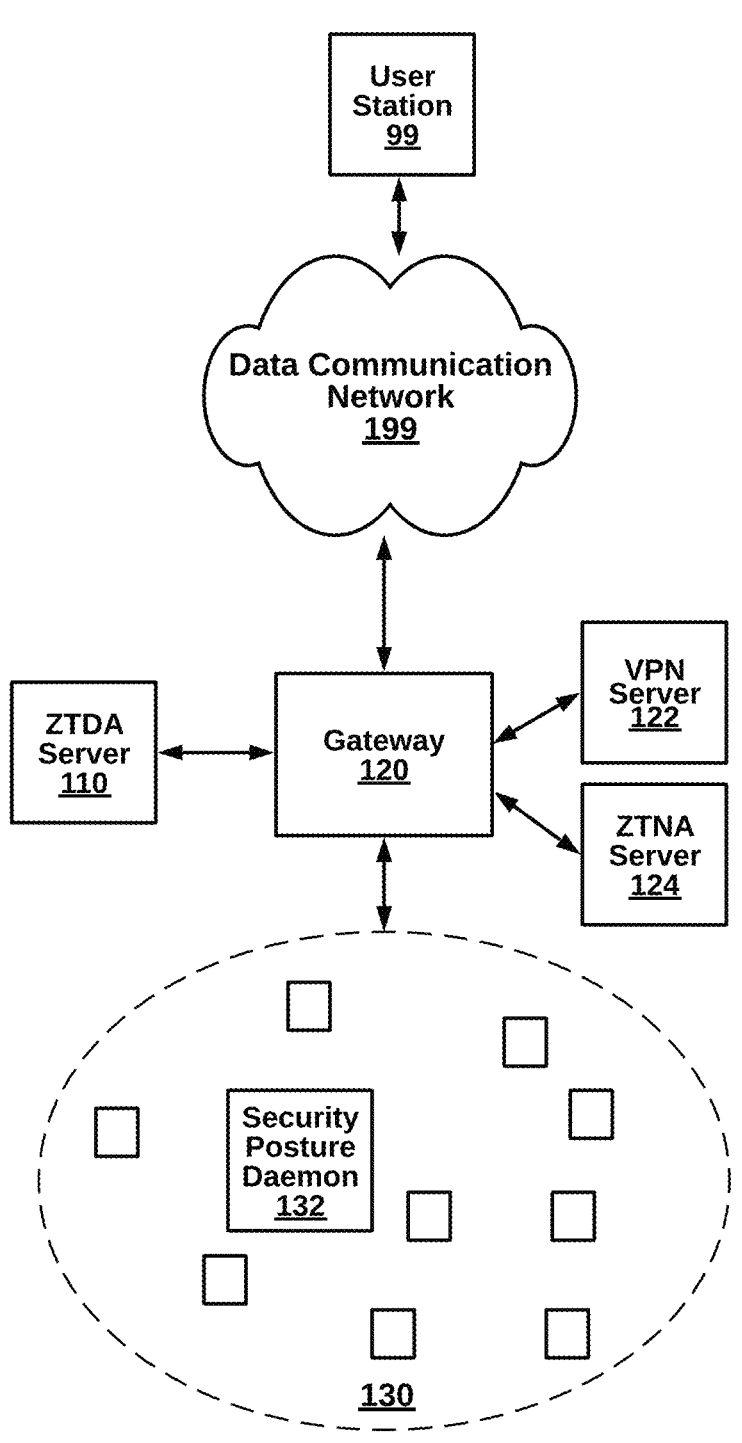
FIG. 1 is a high-level block diagram illustrating aspects of a system for ZTDA based on security posture tags associated with data files, according to some embodiments.
Figure 6:
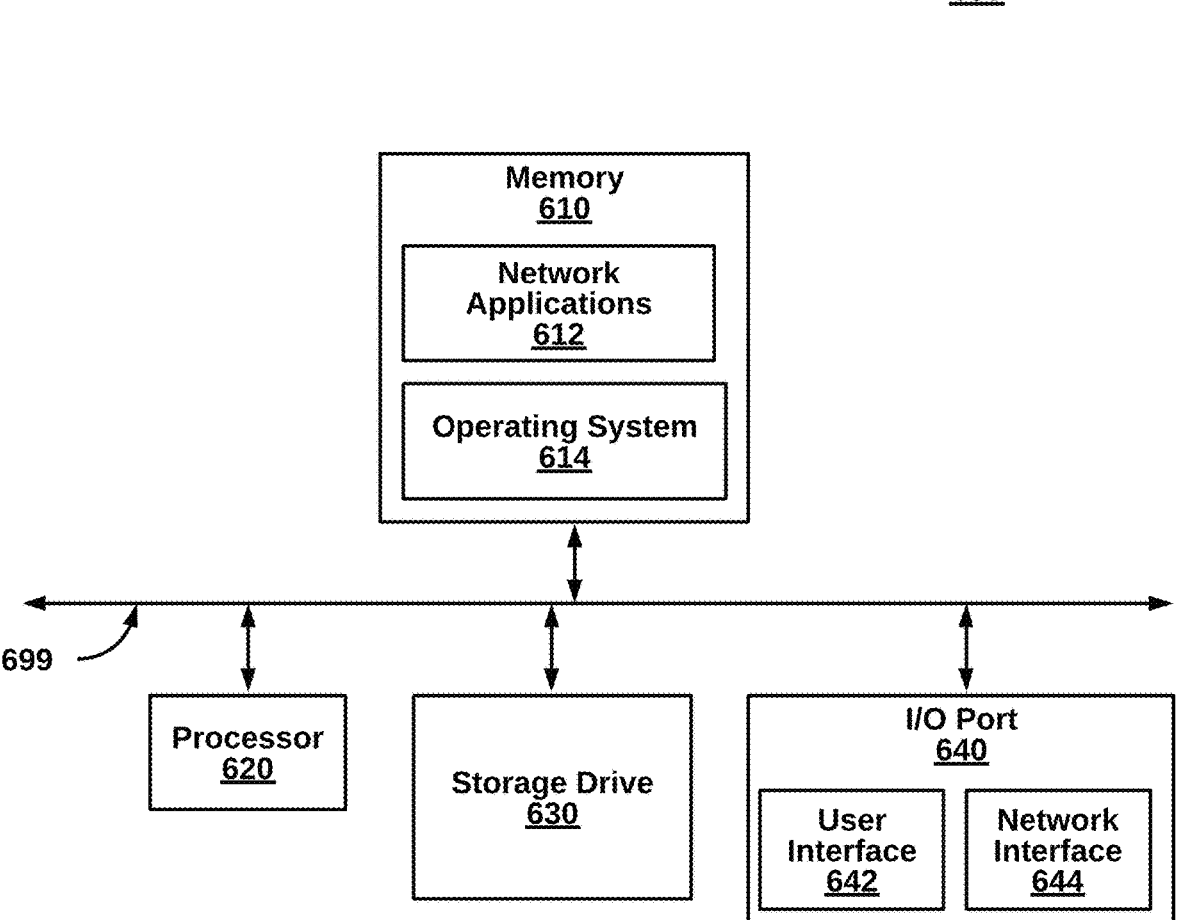
FIG. 6 is a block diagram illustrating an example computing device for the system of FIG. 1, according to an embodiment.

FIG. 1 is a high-level block diagram illustrating a system 100 for ZTDA based on security posture tags associated with data files, according to an embodiment. The system 100 includes ZTDA server 110, a gateway 120 and data files 130 (collectively). Other embodiments of the system 100 can include additional components that are not shown in FIG. 1, such as additional servers and gateways, along with Wi-Fi controllers, access points, routers and switches. The components of system 100 can be implemented in hardware, software, or a combination of both. An example implementation of processor-based hardware components is shown in FIG. 6.

In one embodiment, components of the system 100 are coupled in communication over a private (or enterprise) network connected to a public network, such as the Internet. In another embodiment, system 100 is an isolated, private network, or alternatively, a set of geographically dispersed LANs. The components can be connected to the data communication system via hard wire (e.g., ZTDA server 110, gateway 120, VPN server 122 and ZTNA server 124). The components can also be connected via wireless networking (e.g., malicious actor 99). The data communication network can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or Ipv6 address spaces.

The ZTDA server 110 provides access to data files 130 as guided by ZTDA network policies. A user that creates a data file can also set or modify ZTDA data access policies apart from VPN and ZTNA and other network access policies. In an example process, and as shown in FIG. 3, a user station 99 establishes a secure connection to the enterprise network, as a whole, over data communication network 199 through the VPN network access layer 310. Next, user station 99 establishes permissions to certain applications and/or services on the enterprise network through the ZTNA network access layer 320. Finally, user station 99 accesses a specific data file from data files 130 through the data access layer 330 (e.g., ZDTA layer), as described herein. The document security layer 340 (e.g., password for document enforced by application) may be accessed through a separate request at a local software process (e.g., on user station 99) once the data file has been retrieved. Each of VPN, ZTNA and ZTDA can have separate policies, some of which are harmonic and some of which are contradictory. For instance, a VPN and/or ZTNA time to live (TTL) parameter may still be valid while a TTL set for data access has already expired. As a result, the data access policies constrict access more than VPN or ZTNA in this instance. In other instances, data access policies are more liberal than network access policies. In yet another instance, ZTDA controls data file access without any network access services through VPN and/or ZTNA. More detailed embodiments of the ZTDA server 110 are set forth below with respect to FIG. 2.

In operation, instances of security posture daemon 132 executes on devices of the data farm storing data files 130 to maintain security posture tags. The security posture daemon 132 can interrogate a device and surroundings to collect security posture information and to create and update security posture tags. The security posture information can include any information related to data access security. There can be static information of hardware configuration or operating system. The static information can be updated from time to time by new hardware configurations, hardware driver updates or operating system patches. There can also be dynamic information that snapshots current statistics, such as processor load, memory load or bandwidth. When an individual data file is moved from one hardware device to another, or is moved within a hardware device, security posture daemon 132 initiates updates the security posture tags as needed.

The VPN server 122 and the ZTNA server 124 (or EMS server), work separately or together with ZTDA server 110. Prior to accessing data files, a user can authenticate with an application on the user device 199 that in turn authenticates with VPN server 122 and/or ZTNA server 124. Alternatively, a user can remotely connect through a browser to directly authenticate.

FIG. 2 is a more detailed view of ZTDA server 110 of FIG. 1, according to an embodiment. The ZTDA server 110 further includes a security posture tag module 210, an access request queue 220, a data access processing module 230 and a data file interface 240.

The security posture tag module 210, in an embodiment, calculates security posture tags from security posture updates about data files gathered from a plurality of security posture agents executing on a plurality of network devices. The calculation a comparison of previous data to current data to identify changes. Calculations can be triggered by any of a data file access request, a change in security posture for a data file, or periodic calculations.

The access request queue 220 can receive a request for access including a name of a data file. The request has established secured network access. Also, the request does not include a specific location of the data file.

The access processing module 230 receives a security posture tag associated with the data file. One or more ZTDA network policies are applied. Vulnerabilities can also be identified. These polices can be identified as corresponding to the request, or can be identified as corresponding to the data of the security posture tag.

The data file interface 240 provides access to the data file of the request, subject to application of the one or more ZTDA network policies identified as corresponding to the request. For example, the data file interface 240 connect with a data center for file storage. When the access requests are received, an index locates the data files to complete a connection. In some embodiments, the data file interface 240 maintains the index to translate an access request to a specific address on a backend. The index is updated when data files move from one location to another, whether between devices or within devices.

A data farm is one example implementation of data files. Multiple data files 140 are shown without any tie to a specific device. Thus, storage is constantly optimized and reindexed. However, after optimization, one of the security posture daemons 132 that is resident on the same device calculates a security posture or at least provide relevant data for calculation. A data file can be a document, a record, log updates, an image, a video, a PDF file, DOCX file, a JPG file, or any other appropriate type. The data files can belong to one owner or to multiple owners. The data file type can be random, or an all be the same, in a different implementation. Some example implementations include Dropbox which is a cloud storage solution.

The movement of data files on a backend of the data farm is preferably transparent to user device 99. An index between a name of a data file and a location on a data farm, is created and maintained to enable transparency. As a result, the name of a specific datafile, in some cases, is not related to a backend location.

There are numerous variations to those that are listed herein, that would be apparent to one of ordinary skill in the art, given the disclosure herein.

II. Methods for ZTDA Using Security Posture Tags (FIGS. 4-5)

Figure 4:
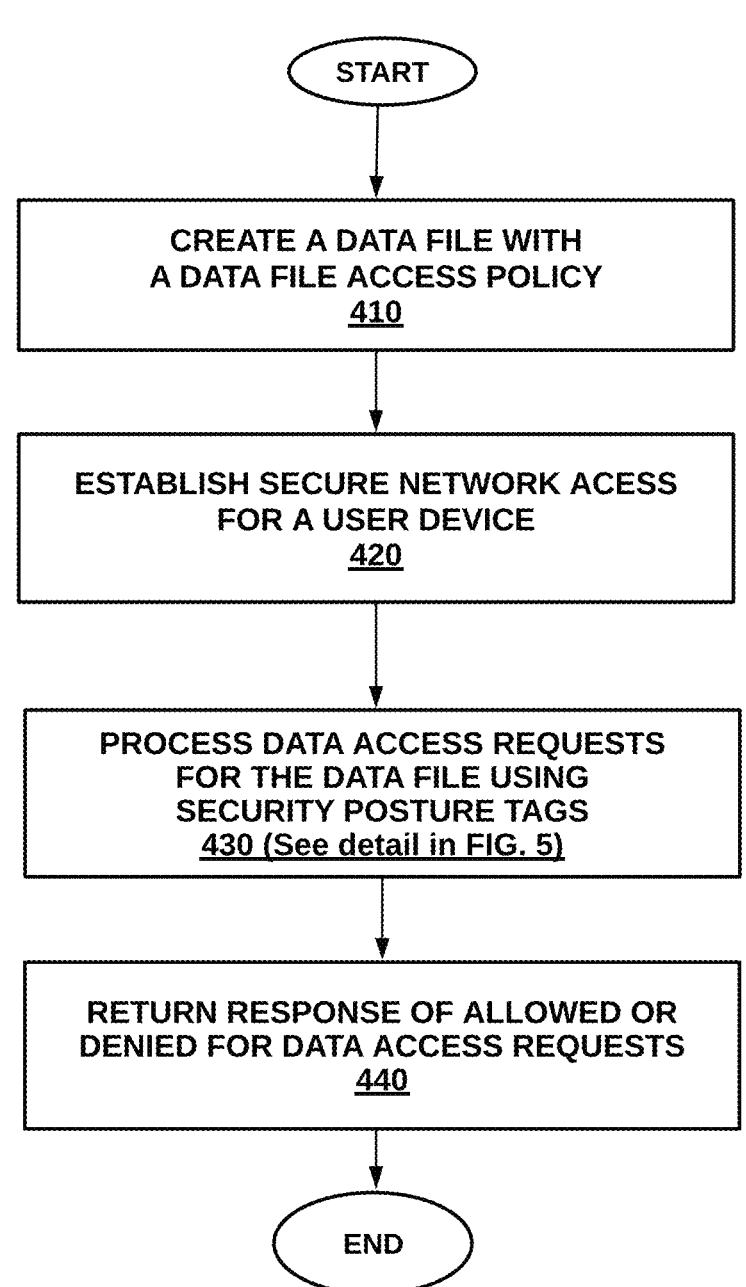
FIG. 4 is a high-level flow diagram of a method for ZTDA based on security posture tags associated with data files, according to an embodiment.

FIG. 4 is a high-level flow diagram of a method 400 for ZTDA based on security posture tags associated with data files, according to an embodiment. The method 400 can be implemented by, for example, system 100 of FIG. 1. The specific grouping of functionalities and order of steps are a mere example as many other variations of method 400 are possible, within the spirit of the present disclosure. Other variations are possible for different implementations.

At step 410, a new data file is created along with a corresponding data file access policy. At step 420, secure network access is established for a user device. At step 430, data access requests for the new data file are processed using security posture tags, as will be described more fully below. At step 440, access to the new data file is granted or denied based on processing.

Figure 5:
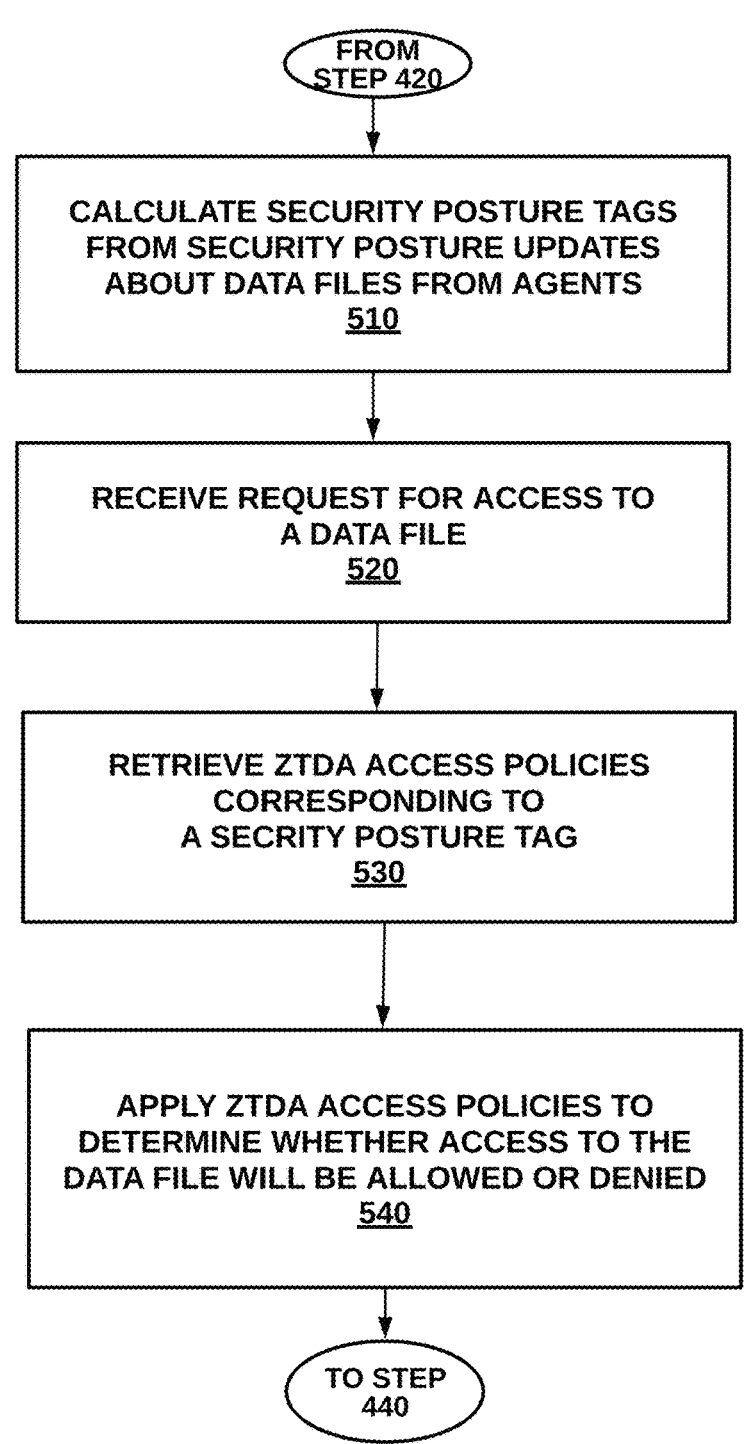
FIG. 5 details a step of processing data access requests for the new data file using security posture tags, according to an embodiment.

Returning to step 430, in FIG. 5 details an example of processing data access requests are shown.

At step 510, security posture tags are calculated from security posture updates about data files gathered from a plurality of security posture agents executing on a plurality of network devices. The calculation can be done automatically or response to data access requests.

At step 520, a request is received for access including a name of a data file. The request has established secured network access (e.g., user device has been authenticated by VPN). The request does not include a specific location of the data file.

At step 530, one or more ZTDA network policies are retrieved as corresponding to a security posture tag associated with the data file is received.

At step 540, the one or more ZTDA network policies are applied to determine whether access to the data file will be allowed or denied. In some cases, access is allowed with some restrictions. A network administrator or a managing security software is able to override the decision.

III. Computing Device for ZTDA Using Security Posture Tags (FIG. 6)

FIG. 6 is a block diagram illustrating a computing device 600 for use in the system 100 of FIG. 1, according to one embodiment. The computing device 600 is a non-limiting example device for implementing each of the components of the system 100, including ZTDA server 110, network gateway 120, VPN server 122 and ZTNA server 124. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer $\frac{2}{3}$ routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTI-GATE family of network security appliances and FORTI-CARRIER family of consolidated security appliances), messaging security appliances (e.g., FORTIMAIL and FORTIPHISH families of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

The invention claimed is:

1. A computer-implemented method in a network security device, on a data communication network, for providing zero trust data access (ZTDA) based on security posture tags associated with data files, the method comprising:

calculating security posture tags from security posture updates about data files gathered from a plurality of security posture agents executing on a plurality of network devices;

receiving a request for access including a name of a data file, wherein the request has established secured network access, and wherein the request does not include a specific location of the data file;

receiving a security posture tag associated with the data file and identifying ZTDA network policies that are relevant;

applying the one or more ZTDA network policies identified as corresponding to the request and/or the data of the security posture tag;

applying the one or more ZTDA policies against the security posture tag at a security agent of a network device storing the data file;

receiving the results from the security agent; and providing access to the data file of the request, subject to application of the one or more ZTDA network policies identified as corresponding to the request.

2. The method of claim 1, further comprising:

identifying one or more zero trust network access (ZTNA) network policies corresponding to the request; and providing access to a network device storing the data file of the request subject to application of the one or more ZTNA network policies identified as corresponding to the request.

3. The method of claim 1, wherein the network security device comprises a firewall.

4. The method of claim 1, wherein the network security device comprises an endpoint management system (EMS) server.

5. The method of claim 1, wherein the information for the security posture updates are initiated by plurality of security agents upon identifying an internal operation relevant to network security.

6. The method of claim 1, wherein the ZTDA security posture tags are stored separately from corresponding data files.

7. The method of claim 1, the request comprise a command related to the data file, selected from one of: move, copy, rename and delete.

8. The method of claim 1, wherein the request is allowed by the network access policies and not allowed by a data access policies.

9. The method of claim 1, wherein the request is allowed by the data access policies and not allowed by the network access policies.

10. A non-transitory computer-readable medium in a network security device, on a data communication network, storing code that when executed, performing a method for providing zero trust data access (ZTDA) based on security posture tags associated with data files, the method comprising:

calculating security posture tags from security posture updates about data files gathered from a plurality of security posture agents executing on a plurality of network devices;

receiving a request for access including a name of a data file, wherein the request has established secured network access, and wherein the request does not include a specific location of the data file;

receiving a security posture tag associated with the data file and identifying ZTDA network policies that are relevant;

applying one or more ZTDA network policies identified as corresponding to the request and/or the data of the security posture tag;

applying the one or more ZTDA policies against the security posture tag at a security agent of a network device storing the data file; and receiving the results from the security agent; and providing access to the data file of the request, subject to application of the one or more ZTDA network policies identified as corresponding to the request.

11. The method of claim 10, further comprising:

identifying one or more zero trust network access (ZTNA) network policies corresponding to the request; and providing access to a network device storing the data file of the request subject to application of the one or more ZTNA network policies identified as corresponding to the request.

12. A network security device, on a data communication network, for providing zero trust data access (ZTDA) based on security posture tags associated with data files, the network security device comprising:

a processor;

a network interface communicatively coupled to the processor and to a data communication network; and a memory, communicatively coupled to the processor and storing:

a security posture tag module to calculate security posture tags from security posture updates about data files gathered from a plurality of security posture agents executing on a plurality of network devices;

an access request queue to receive a request for access including a name of a data file, wherein the request has established secured network access, and wherein the request does not include a specific location of the data file;

a ZTDA module to receive a security posture tag associated with the data file and identifying ZTDA network policies that are relevant, wherein the ZTDA module applies one or more ZTDA network policies identified as corresponding to the request and/or the data of the security posture tag;

applies the one or more ZTDA network policies against the security posture tag at a security agent of a network device storing the data file; and receives the results from the security agent; and a file database interface to provide access to the data file of the request, subject to application of the one or more ZTDA network policies identified as corresponding to the request.

13. The network security device of claim 12, further comprising:

identifying one or more zero trust network access (ZTNA) network policies corresponding to the request; and providing access to a network device storing the data file of the request subject to application of the one or more ZTNA network policies identified as corresponding to the request.

* * * * *